Feb. 21, 1956                I. SACKS                2,735,356
                          ELECTRIC GRILLS
Filed April 28, 1953                              2 Sheets-Sheet 1
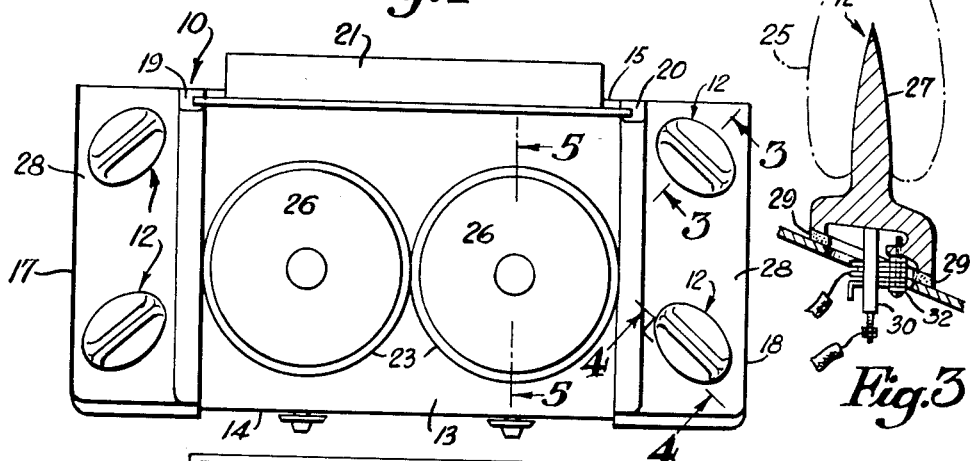
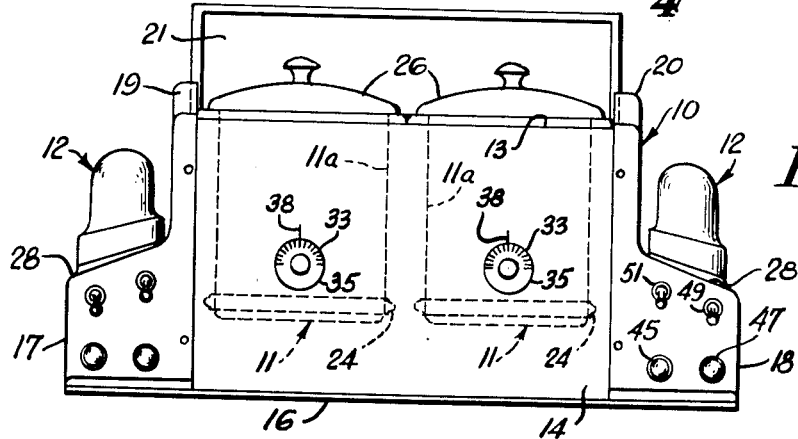
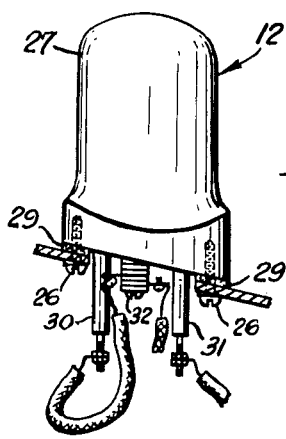
INVENTOR.
IRVING SACKS
BY
ATTORNEYS Feb. 21, 1956
I. SACKS
2,735,356
ELECTRIC GRILLS
Filed April 28, 1953
2 Sheets—Sheet 2
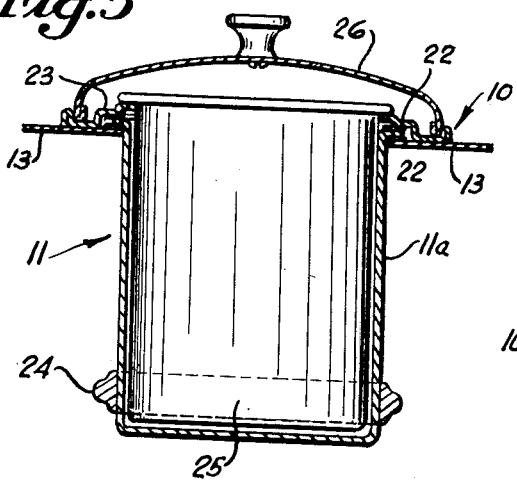
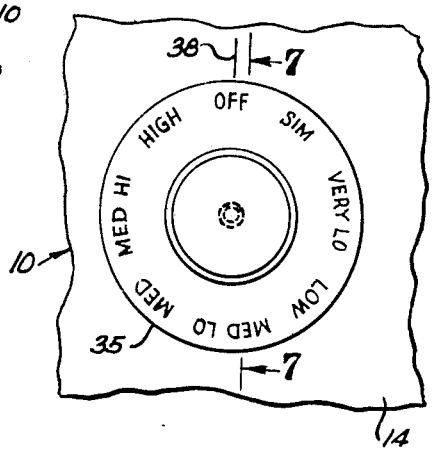
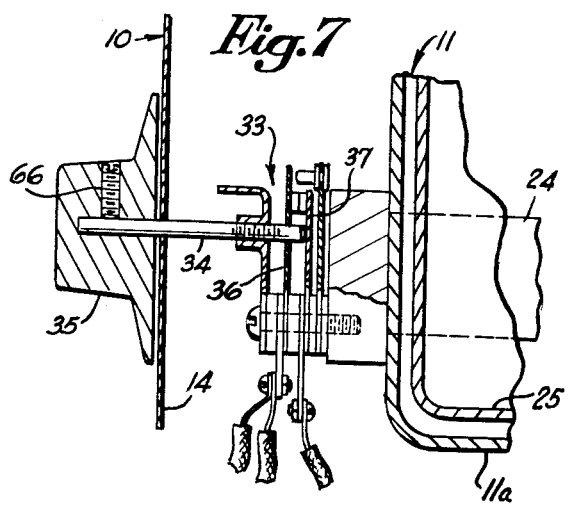
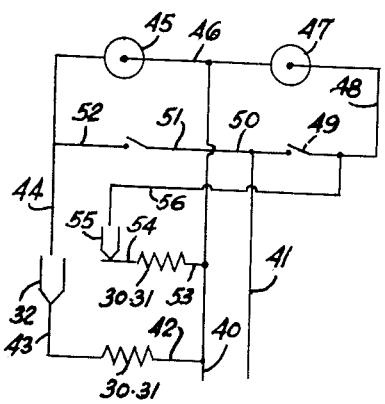
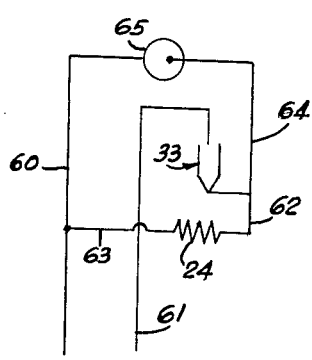
INVENTOR.
IRVING SACKS
BY *Richard J. Geier*
ATTORNEYS

United States Patent Office 2,735,356
Patented Feb. 21, 1956

2,735,356

ELECTRIC GRILLS

Irving Sacks, Brooklyn, N. Y.

Application April 28, 1953, Serial No. 351,710

1 Claim. (Cl. 99—339)

This invention relates to improvements in electric grills for the preparation of toasted sandwiches from rolls.

It is an object of the instant invention to provide heat conditioned dual receptacles for the storage of the sandwich filling and a toaster for the rolls.

Another object is to provide a toaster that will both slit and toast the rolls on both slitted surfaces in a single operation.

A further object is to provide manually variable heat for the receptacles and automatic means for limiting the maximum heat of the toasters.

Other objects of the instant invention will become apparent in the course of the following specification.

In the attainment of the aforesaid objectives, the improved grill is constituted of a housing with outwardly directed L-shaped ends. In the top of the housing are two longitudinally spaced circular openings. In each opening is a dual container constituted of an outer heat well and an inner receptacle removably inserted through the open top of the well. In the substantially horizontal portion of each outwardly directed L-shaped end are two spaced toasters designed with an upwardly directed slitting and toasting surface for partially cutting and then toasting the roll on both sides of the cut. An electric heater is incorporated in each heat well and each toaster. An adjustable bimetallic component is connected in the circuit of each heat well heater and a fixed bimetallic component in the circuit of each toaster heater. A rotatably mounted dial on the front of the housing varies the spacing of the elements of the bimetallic component in the circuit of each heat well heater to provide a wide range of temperature selections. The electric circuits are so arranged that the toaster heaters can be operated independently of the heat well heaters while lights in the circuits indicate the on and off conditions thereof.

The invention will appear more clearly from the following detailed description when taken in conjunction with the accompanying drawings showing by way of example a preferred embodiment of the inventive concept.

In the drawings:

Figure 1 is a top plan view of the electric grill constructed in accordance with the principles of this invention;

Figure 2 is a front elevational view of the grill shown in Figure 1;

Figure 3 is a sectional view along 3—3 of Figure 1;

Figure 4 is a sectional view along 4—4 of Figure 1;

Figure 5 is a sectional view along 5—5 of Figure 1;

Figure 6 is an enlarged front view of one of the heat well temperature control dials shown in Figure 2;

Figure 7 is a sectional view along 7—7 of Figure 6;

Figure 8 is a circuit diagram for the electric heaters of the toasters at each end of the housing; and Figure 9 is a circuit diagram for the electric heater of each heat well.

Referring now in greater detail to the drawings where like reference numerals indicate like parts, reference numeral 10 indicates the housing, 11 (Figs. 2 and 5) the dual receptacles, and 12 the toasters.

The housing 10 is constituted in part of the top member 13, the front member 14, and the back member 15 (Fig. 1). Each member may be of substantially rectangular form and made from heat resistant material. The front member 14 and the back member 15 downwardly depend in spaced parallel arrangement from opposite longitudinal edges of the top member 13 or are otherwise secured thereto. Each end of the housing is closed with the oppositely directed L-shaped end members 17 and 18, the top surface of each outwardly directed portion of which may be downwardly inclined, as illustrated. A bottom member 16 (Fig. 2) is removably secured over the corresponding bottom edges of the front and back and end members. At the back of each end member and along the line of jointure with the top member 13 are the upwardly directed protuberances 19 and 20 in which are vertically directed coacting slideways for the removable insertion of an upright display board 21 which may be designed for electrically illuminated letters descriptive of the sandwiches prepared by the grill. Any suitable means (not shown) may be used for electrically illuminating the letters.

Through the top member 13 are two longitudinally spaced circular openings. In each opening is a dual container constituted of an outer heat well 11a (Figs. 5 and 7), and an inner receptacle 25, each of which has an open top.

The peripheral edge of the open top of each well 11a is turned outwardly (Fig. 5) to form a flange for the support of the well around the peripheral edge of the opening. Over the top and under the bottom of the flange of each well are similar annular gaskets 22 (Fig. 5). A collar 23 is placed over the uppermost gasket and secures the gaskets in place, the collar being fastened to the top surface 13 by any suitable means. At the bottom and around the outer surface of each well is an electric heater 24 commonly called a Calrod.

An inner receptacle 25 is removably inserted through the open top of each well 11. The peripheral edge of the open top of each receptacle 25 is also turned outwardly (Fig. 5) to form a rim which is supported by the previously mentioned collar 23. Over the open top of each inner receptacle is a cover member 26, the downwardly turned periphery of which is removably supported in a circumferential recess in the collar 23, as illustrated in Figure 5. As also illustrated, each inner receptacle is in spaced concentric arrangement with the well when inserted therein.

In the outwardly and downwardly inclined top surface of each end member 17 and 18 are two elliptical openings in spaced transverse arrangement relative to the top member 13. Over each elliptical opening and upwardly directed therefrom is a toaster 12. Any suitable means, such as the screws 26 shown in Figure 4, may be used to fasten the base of a toaster over an opening. Each toaster is similar and is constituted of a slitting and heating surface 27 (Fig. 3) upwardly directed from a base member, the surface being especially designed to slit a roll 28 partially and then hold and toast the roll on both slit surfaces. A heat insulating gasket 29 is placed between the bottom of each toaster and the surface of the end member to reduce the transfer of heat from the toaster to the housing. Upwardly directed through the bottom of each toaster is a pair of spaced heating elements 30 and 31 (Fig. 4) in the circuit of which is a preset bimetallic element 32 designed to break the circuit when the preset temperature is reached.

For the variable control of the electric heaters of each heat well 11, a known variable bimetallic component 33 (Fig. 7) is used. By varying the relative positions of the bimetallic elements of the component a wide variety of temperatures is possible. To vary the relative positions of the elements, a shaft 34 is rotatably passed through the front member 14 of the housing. Removably secured on the outer end of the shaft is an indicator dial 35 around the circumferential periphery of which are the heat variation indicia (Fig. 6), such as off, sim, very low, low, medium low, medium, medium high, and high, which coact with an indicator mark 38 on the front member or on a circular frame (not shown), fastened to the front member and in which the dial rotates. The inner end of the shaft 34, suitably insulated, is rotatably passed through the element 36 and rotatably secured to the element 37 for the reciprocable movement of the latter relative to the former in a known manner. The procedure for setting the dial, so that the heat indicia thereon is actually indicative of the heat in the inner receptacle is described later.

Referring now to the circuit diagram of Figure 8 for the two toasters in each end of the housing, 40 and 41 indicate two conductors leading from an EMF source. A tap 42 is taken off the conductor 40 and connected to one side of the heater element 31, for example. A conductor 43 connects the free side of the heater element to one side of a known and fixed bimetallic component 32. A conductor 44 connects the free side of the bimetallic component to one side of a glow lamp 45. A conductor 46 connects the free side of the glow lamp to the conductor 40 and to one side of a second glow lamp 47. A conductor 48 connects the free side of the lamp 47 to one side of a switch 49. A conductor 50 connects the free side of the switch 49 to the conductor 41 and to one side of a second switch 51. The conductor 52 connects the free side of the switch 51 to the conductor 44. A conductor 53 connects the conductor 40 to one of the heater elements 30—31 of the second toaster. The conductor 54 connects the free heater element to one side of a bimetallic element 55 and a conductor 56 connects the free side of the bimetallic element 55 to the conductor 48.

Referring to the circuit diagram in Figure 9 for the heating unit 24 of each heat well, reference numerals 60 and 61 indicate conductors leading from an EMF source. The conductor 61 is connected to one side of the adjustable bimetallic component 33, the opposite side of which is connected by a conductor 64 to one side of the glow lamp 65 with the opposite side of the lamp connected to the conductor 60. A conductor 62 connects the conductor 64 to one side of the heater element 24, while a conductor 63 connects the free side of the heater element 24 to the conductor 60. The glow lamp 45 or 47, or both, of the circuit diagram of Figure 8 may be readily substituted for the glow lamp 65 so that only two glow lamps at each end of the housing will give a visual indication of the functioning of the heat well and the toasters adjacent that end.

Assume that the heat indicia of one dial 35 relative to the mark 38 through accident is no longer indicative of the true temperature in the receptacle 25, the temperature of which is controlled by the dial, and it is desired to correct the setting of the dial. While the heat wells can be operated dry, place a cup of water in the well of the container under test after the receptacle 25 has been removed and then replace the receptacle. Loosen the set screw 66 (Fig. 7) of the dial 35 opposite the container, slip the dial off the end of the shaft 34, and turn the shaft counterclockwise until the glow lamps go on. If the glow lamps are already on, turn the shaft 34 clockwise until the lamps go out and then counterclockwise for about one-quarter of a turn. Allow the container to operate for about ten minutes and place a Fahrenheit thermometer in the receptacle 25 where the reading should be about 112° F. If the temperature reads higher than 112° F., turn the shaft 34 clockwise. If the temperature reads less than 112° F., turn the shaft 34 counterclockwise. When around 112° is reached, permitting the container to operate for about ten minutes, reattach the dial 35 to the end of the shaft 34 with the medium indicia label thereon under the mark 38.

While there is above disclosed but one embodiment of the structure of the invention herein presented, it is possible to produce still other embodiments without departing from the inventive concept herein disclosed, and it is desired, therefore, that only such limitations be imposed on the appended claims as are stated therein.

What is claimed is:

An electric grill comprising a casing having a central portion having two opposed vertical walls and surfaces adjoining said walls and extending downwardly in opposite directions, at least one separate vertical blade-like bun cutter and toaster upon each one of said surfaces, each of said bun cutters and toasters having a central plane intersecting the adjacent vertical wall at an acute angle, the central portion of the casing having at least one opening, a well within said opening and having a flange extending over the edge of said opening, a gasket under the bottom of said flange, another gasket over the top of said flange, a collar connected to the casing and extending over said other gasket, an inner receptacle within said well and having a rim supported by said collar, said collar having a recess formed therein, and a cover having a downwardly turned periphery removably supported in said recess.

References Cited in the file of this patent

UNITED STATES PATENTS

| | | |
|---|---|---|
| D. 167,077 | Gunther | June 24, 1952 |
| 1,848,030 | Sibley | Mar. 1, 1932 |
| 2,043,797 | Horn | June 9, 1936 |
| 2,075,474 | Scutt | Mar. 30, 1937 |
| 2,121,444 | Osrow | June 21, 1938 |
| 2,182,682 | Shroyer | Dec. 5, 1939 |
| 2,242,328 | Russell et al. | May 20, 1941 |
| 2,310,044 | Stevenson | Feb. 2, 1943 |
| 2,334,122 | Payne | Nov. 9, 1943 |
| 2,480,337 | Pearce | Aug. 30, 1949 |
| 2,481,384 | Blackwell | Sept. 6, 1949 |
| 2,491,529 | Spreen | Dec. 20, 1949 |
| 2,648,275 | Thompson | Aug. 11, 1953 |

FOREIGN PATENTS

| | | |
|---|---|---|
| 350,436 | Great Britain | June 5, 1931 |